(12) United States Patent
Wolfgang et al.

(10) Patent No.: US 7,647,462 B2
(45) Date of Patent: *Jan. 12, 2010

(54) METHOD, SYSTEM, AND PROGRAM FOR DATA SYNCHRONIZATION BETWEEN A PRIMARY STORAGE DEVICE AND A SECONDARY STORAGE DEVICE BY DETERMINING WHETHER A FIRST IDENTIFIER AND A SECOND IDENTIFIER MATCH, WHERE A UNIQUE IDENTIFIER IS ASSOCIATED WITH EACH PORTION OF DATA

(75) Inventors: John Jay Wolfgang, Tucson, AZ (US); Kenneth Wayne Boyd, Tucson, AZ (US); Kenneth Fairclough Day, III, Tucson, AZ (US); Philip Matthew Doatmas, Tucson, AZ (US); Kirby Grant Dahman, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 354 days.

This patent is subject to a terminal disclaimer.

(21) Appl. No.: 11/548,220

(22) Filed: Oct. 10, 2006

(65) Prior Publication Data

US 2007/0130216 A1 Jun. 7, 2007

Related U.S. Application Data

(63) Continuation of application No. 10/671,295, filed on Sep. 25, 2003, now Pat. No. 7,143,117.

(51) Int. Cl.
*G06F 17/30* (2006.01)
*G06F 7/00* (2006.01)
*G06F 16/16* (2006.01)
*G06F 12/00* (2006.01)

(52) U.S. Cl. ............................... 711/162; 707/1; 707/2; 707/3; 707/4; 707/100; 707/101; 707/102; 707/103; 707/104; 707/200; 707/201; 707/204; 709/240; 709/241; 709/242; 709/243; 709/244; 709/245; 709/246; 709/247; 709/248; 711/114; 711/161; 714/6; 714/7; 714/20

(58) Field of Classification Search .................. 707/6, 707/100, 200; 709/240–248; 711/161, 162, 711/114
See application file for complete search history.

(56) References Cited

U.S. PATENT DOCUMENTS 4,480,304 A 10/1984 Carr et al.

(Continued)

FOREIGN PATENT DOCUMENTS

CA 2 496 375 8/2005

(Continued)

OTHER PUBLICATIONS

IBM Corp., "z/OS DFSMS Advanced Copy Services", IBM Document #SC35-0428-00, Apr. 2001, pp. 1-219.

(Continued)

*Primary Examiner*—Brian R Peugh
*Assistant Examiner*—Mehdi Namazi
(74) *Attorney, Agent, or Firm*—Janaki K. Davda

(57) ABSTRACT

Disclosed is a technique for data synchronization. A first identifier for a portion of data on a primary volume is determined, wherein a unique identifier is associated with each portion of data at the primary volume. A second identifier for a portion of corresponding data at a secondary volume is determined, wherein a unique identifier is associated with each portion of data at the secondary volume. The first and second identifiers are compared. When the first and second identifiers do not match, the portion of corresponding data at the secondary volume in a storage device is replaced with the portion of data at the primary volume.

36 Claims, 7 Drawing Sheets

U.S. PATENT DOCUMENTS

| | | | |
|---|---|---|---|
| 5,339,398 A | | 8/1994 | Shah et al. |
| 5,649,196 A | | 7/1997 | Woodhill et al. |
| 5,727,181 A | * | 3/1998 | Beglin et al. ............... 711/114 |
| 5,768,532 A | | 6/1998 | Megerian |
| 5,875,461 A | | 2/1999 | Lindholm |
| 5,970,502 A | * | 10/1999 | Salkewicz et al. ........... 707/201 |
| 6,108,754 A | | 8/2000 | Lindholm |
| 6,141,663 A | * | 10/2000 | Hunkins et al. ............. 707/201 |
| 6,199,074 B1 | * | 3/2001 | Kern et al. .................. 707/204 |
| 6,212,521 B1 | | 4/2001 | Minami et al. |
| 6,249,849 B1 | * | 6/2001 | Day et al. .................... 711/161 |
| 6,438,563 B1 | * | 8/2002 | Kawagoe ..................... 707/201 |
| 6,446,090 B1 | * | 9/2002 | Hart ............................. 707/201 |
| 6,470,462 B1 | | 10/2002 | Karlsson et al. |
| 6,493,727 B1 | * | 12/2002 | Huang et al. ................. 707/201 |
| 6,529,917 B1 | * | 3/2003 | Zoltan ......................... 707/201 |
| 6,606,694 B2 | * | 8/2003 | Carteau ....................... 711/162 |
| 6,636,876 B1 | * | 10/2003 | Ishihara et al. .............. 707/202 |
| 6,694,337 B1 | | 2/2004 | King |
| 6,732,144 B1 | * | 5/2004 | Kizu et al. ................... 709/203 |
| 6,751,634 B1 | | 6/2004 | Judd |
| 6,857,044 B2 | * | 2/2005 | Beeston et al. .............. 711/111 |
| 7,013,315 B1 | | 3/2006 | Boothby |
| 7,024,584 B2 | | 4/2006 | Boyd et al. |
| 2002/0059299 A1 | | 5/2002 | Spaey |
| 2002/0075981 A1 | | 6/2002 | Tang et al. |
| 2003/0143989 A1 | | 7/2003 | Ho et al. |
| 2004/0030703 A1 | | 2/2004 | Bourbonnais et al. |
| 2004/0133591 A1 | | 7/2004 | Holenstein et al. |
| 2004/0139366 A1 | | 7/2004 | Boyd et al. |
| 2005/0010732 A1 | | 1/2005 | Boyd et al. |
| 2005/0021575 A1 | | 1/2005 | Boyd et al. |
| 2005/0050287 A1 | | 3/2005 | Boyd et al. |
| 2005/0177692 A1 | | 8/2005 | Boyd et al. |
| 2005/0193247 A1 | | 9/2005 | Doatmas et al. |
| 2005/0278360 A1 | | 12/2005 | Boyd et al. |

FOREIGN PATENT DOCUMENTS

| | | |
|---|---|---|
| EP | 1267283 A2 | 12/2002 |
| WO | 01 90933 | 11/2001 |
| WO | 02077860 A1 | 10/2002 |
| WO | 2004070625 | 8/2004 |
| WO | 2004114152 | 12/2004 |
| WO | 2005066836 | 7/2005 |

OTHER PUBLICATIONS

F.A. Porto, et al., "Persistent Object Synchronization with Active Relational Databases", Proceedings Technology of Object Oriented Languages and System, Aug. 1999, pp. 53-62.

R.J. Ramadea, "Database Synchronization in Military Command and Control System", Conference on Information-Decision-Action Systems in Complex Organisation, Apr. 1992, pp. 115-117.

Z. Itani et al., "Efficient Pull Based Replication and Synchronization for Mobile Databases", Pervasive Services, Jul. 2005, ICPS '05 Proceedings, pp. 401-404.

J. Choo et al., "Synchronizing a Database to Improve Freshness", Proceedings of the 2000 ACM SIGMOD International Conference on Management of Data, 2000, pp. 117-128.

\* cited by examiner

METHOD, SYSTEM, AND PROGRAM FOR DATA SYNCHRONIZATION BETWEEN A PRIMARY STORAGE DEVICE AND A SECONDARY STORAGE DEVICE BY DETERMINING WHETHER A FIRST IDENTIFIER AND A SECOND IDENTIFIER MATCH, WHERE A UNIQUE IDENTIFIER IS ASSOCIATED WITH EACH PORTION OF DATA

RELATED APPLICATION

This application is a continuation of U.S. Pat. No. 7,143,117, having U.S. patent application Ser. No. 10/671,295, filed on Sep. 25, 2003, which is incorporated herein by reference in its entirety.

BACKGROUND OF THE INVENTION

1. Field of the Invention

The present invention is related to improved data synchronization.

2. Description of the Related Art

In typical disaster recovery solutions, data is housed at a primary site as well as at one or more secondary sites. These secondary sites maintain a synchronized copy of the data such that no data is lost in the case of a disaster at the primary site. If a disaster occurs, processing is either "failed-over" to one of the secondary sites or the data is copied from the secondary site back to the primary site. In order for disaster recovery to be effective, the secondary sites are typically far away from the primary site so that both sites are not affected by the same disaster.

Disaster recovery systems typically address two types of failures, a sudden catastrophic failure at a single point in time or data loss over a period of time. In the second type of gradual disaster, updates to volumes may be lost. For either type of failure, a copy of data may be available at a remote location. Such dual or shadow copies are typically made as the application system is writing new data to a primary storage device at a primary site. A storage device is a physical unit that provides a mechanism to store data on a given medium, such that the data can be subsequently retrieved. International Business Machines Corporation (IBM), the assignee of the subject patent application, provides systems for maintaining remote copies of data at a secondary storage device, including extended remote copy (XRC®) and peer-to-peer remote copy (PPRC).

These systems provide techniques for recovering data updates between a last, safe backup and a system failure. Such data shadowing systems can also provide an additional remote copy for non-recovery purposes, such as local access at a remote site. The IBM XRC and PPRC systems are described further in z/OS V1R1.0 DFSMS Advanced Copy Services (IBM Document Number SC35-0428-00), April 2001, which is available from International Business Machines Corporation.

In such backup systems, data is maintained in volume pairs. A volume pair is comprised of a volume in a primary storage device and a corresponding volume in a secondary storage device that includes a consistent copy of the data maintained in the primary volume. Typically, the primary volume of the pair will be maintained in a primary storage control unit, and the secondary volume of the pair is maintained in a secondary storage control unit at a different physical location than the primary storage control unit. A storage control unit is a physical hardware unit that consists of a storage server integrated with one or more storage devices to provide storage capability to a host computer. A storage server is a physical unit that provides an interface between one or more storage devices and a host computer by providing the function of one or more logical subsystems. The storage server may provide functions that are not provided by the storage device. The storage server is composed of one or more clusters of storage devices. A primary storage control unit may be provided to control access to the primary DASD and a secondary storage control unit may be provided to control access to the secondary DASD.

It is important that all secondary data sites are synchronized and contain an exact copy of the primary site's data. Sometimes, however, errors occur that cause the system to not know whether the primary and secondary sites are synchronized. In typical disaster recovery solutions, if a secondary site loses certainty of synchronization with the primary site, all of the data must be copied from the primary site to the secondary site. For large systems that are typical for large corporations, the time required to resynchronize the two sites is enormous due to the tremendous amount of data that must now be copied. Besides the time it takes to carry out this copy, it must also be remembered that as a result of this recopy, the data link between the two sites is being used much more heavily than is typical. This also causes normal processing that continues to be impacted since the bandwidth necessary to continue may no longer be available.

In particular, in prior art systems, when two volumes lose synchronization for any reason, it is necessary for the primary site to send the entire volume of data to the secondary site. If many volumes are affected and/or the volumes are very large, this could take a considerable amount of time. Not only will it take a long time, but all the data being sent will increase the bandwidth used on the long distance data link tremendously. If the system does not have a good amount of extra bandwidth, and, typically, conventional systems do not, then this resynchronization would impact all other processing and disaster recovery mirroring currently happening in the system as well. Furthermore, in most cases of lost synchronization, very little of the data, if any, is actually out of synchronization. As a result, the entire volume of data will be recopied when only a few portions of data are actually not identical.

Thus, there is a need for improved data synchronization.

SUMMARY OF THE INVENTION

Provided are a method, system, and program for data synchronization. A first identifier for a portion of data on a primary volume is determined, wherein a unique identifier is associated with each portion of data at the primary volume. A second identifier for a portion of corresponding data at a secondary volume is determined, wherein a unique identifier is associated with each portion of data at the secondary volume. The first and second identifiers are compared. When the first and second identifiers do not match, the portion of corresponding data at the secondary volume in a storage device is replaced with the portion of data at the primary volume.

The described implementations of the invention provide a method, system, and program for determining whether or not first and second data sets (e.g., volumes) are synchronized and, if the first and second datasets are not synchronized, to identify which data needs to be synchronized. Thus, if only portions of the first and second data sets need to be synchronized, implementations of the invention copy only those portions from one data set to the other.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several implementations of the present invention. It is understood that other implementations may be utilized and structural and operational changes may be made without departing from the scope of the present invention.

Figure 1:
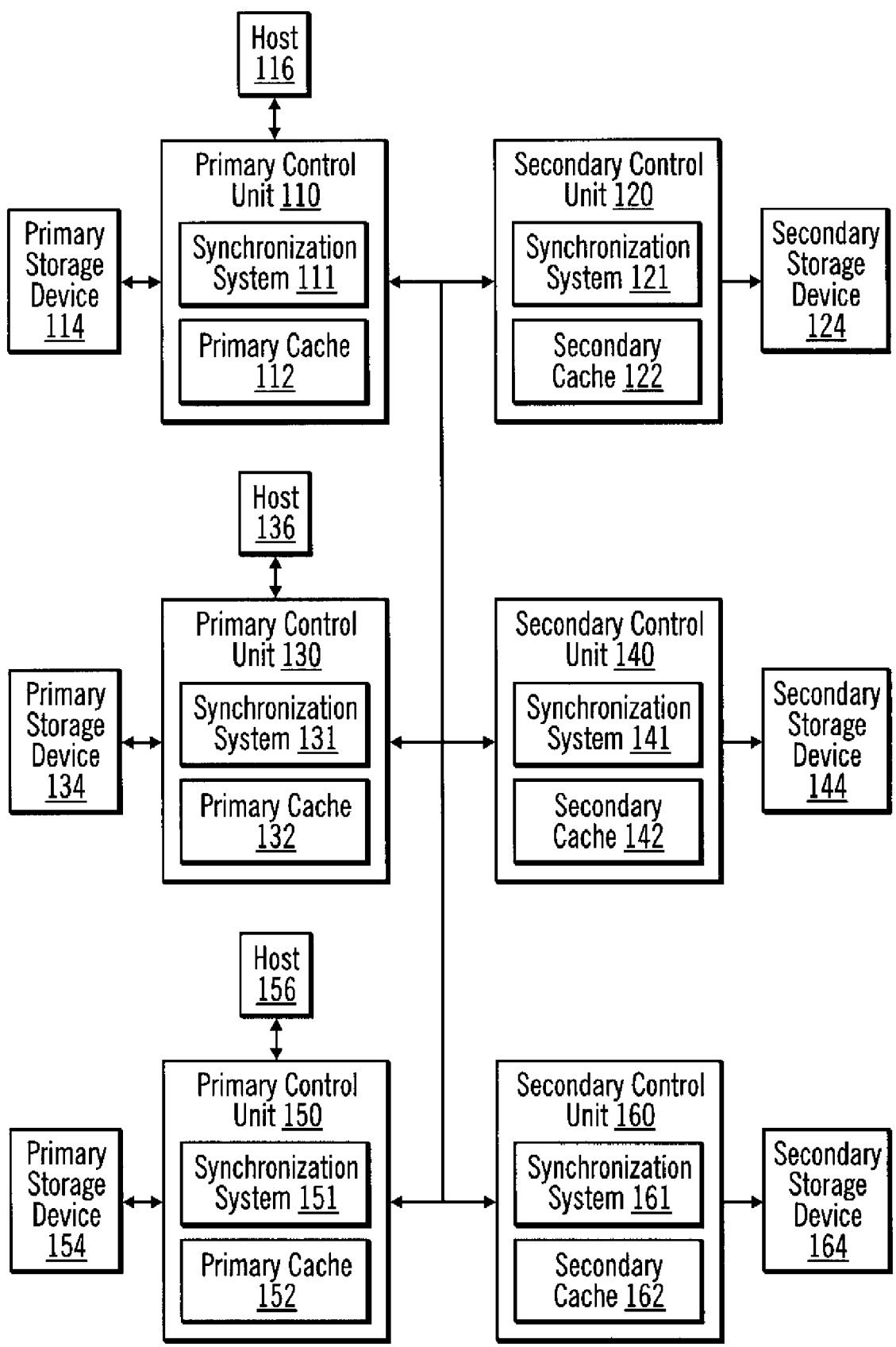
FIG. 1 illustrates, in a block diagram, a computing environment in accordance with certain implementations of the invention.

FIG. 1 illustrates, in a block diagram, a computing environment in accordance with some implementations of the invention. Primary control units 110, 130, and 150 provide one or more host computers 116, 136, or 156, respectively, access to primary storage devices 114, 134, and 154, respectively. The primary storage devices may be, for example, primary DASD. One or more applications may be executing on each host computer 116, 136, or 156 to update data on the primary storage devices. The primary control units 110, 130, and 150 also have primary caches 112, 132, and 152, respectively, in which updates to tracks in the primary storage devices 114, 134, and 154, respectively, are maintained until destaged to the primary storage devices 114, 134, and 154. Back-up copies of all or a subset of the volumes of the primary storage devices 114, 134, and 154 may be maintained at secondary storage devices 124, 144, and 164, respectively.

A primary site may include primary control units 110, 130, and 150, primary storage device 114, 134, and 154, and host computers 116, 136, and 156. A secondary site may include secondary control units 120, 140, and 160, and secondary storage devices 124, 144, and 164. The secondary control units 120, 140, and 160 also have secondary caches 122, 142, and 162. Operator computers (not shown) may be attached to the secondary control units 120, 140, and 160. The secondary storage devices may be, for example, secondary DASD.

In some implementations, a "volume pair" comprises a volume in the primary storage device and the shadow of that volume in the secondary storage device that maintains a backup copy of the data at the primary volume in the volume pair. In certain implementations, for each primary volume, there is a corresponding secondary volume with consistent contents; this is a volume pair. For example, updates to the primary storage device 114 are transferred to the secondary control unit 120 for storage in the secondary storage device 124.

The primary control units 110, 130, and 150 may further include a non-volatile storage unit (not shown), such as a battery-backed up volatile memory, to maintain a non-volatile copy of data updates. In certain implementations of the invention, the primary control units 110, 130, and 150 and secondary control units 120, 140, and 160 may be comprised of the IBM TotalStorage 2105 Enterprise Storage Server (2105 ESS), which is available from International Business Machines Corporation.

Each primary control unit 110, 130, and 150 and secondary control unit 120, 140, and 160 includes a synchronization system 111, 121, 131, 141, 151, and 161 for providing synchronization of data. In certain implementations of the invention, the synchronization system 111, 121, 131, 141, 151, and 161 comprises a data storage controller (i.e., a storage control unit) and includes a unique identifier generator.

In certain implementations, the primary control units 110, 130, 150 and secondary control units 120, 140, and 160 communicate via communication paths, such as direct high speed transmission lines (e.g., an Enterprise System Connection (ESCON®) link). However, the communication paths may be comprised of any other communication means known in the art, including network transmission lines, fiber optic cables, etc.

Updates made to primary storage devices 114, 134, and 154 are transferred to secondary control units 120, 140, and 160. The transfer of updates may occur in any manner. In certain implementations, backup data may be transferred from any primary control unit 110, 130, and 150 to any secondary control unit 120, 140, and 160. Each volume from each primary storage device corresponds to a volume on a secondary storage device. For example, a first volume on primary storage device 114 is backed up to a volume on secondary storage device 124, and a second volume on primary storage device 134 is backed up to a volume on secondary storage device 144. In certain implementations, one or more volumes are not backed up.

Figure 2A:
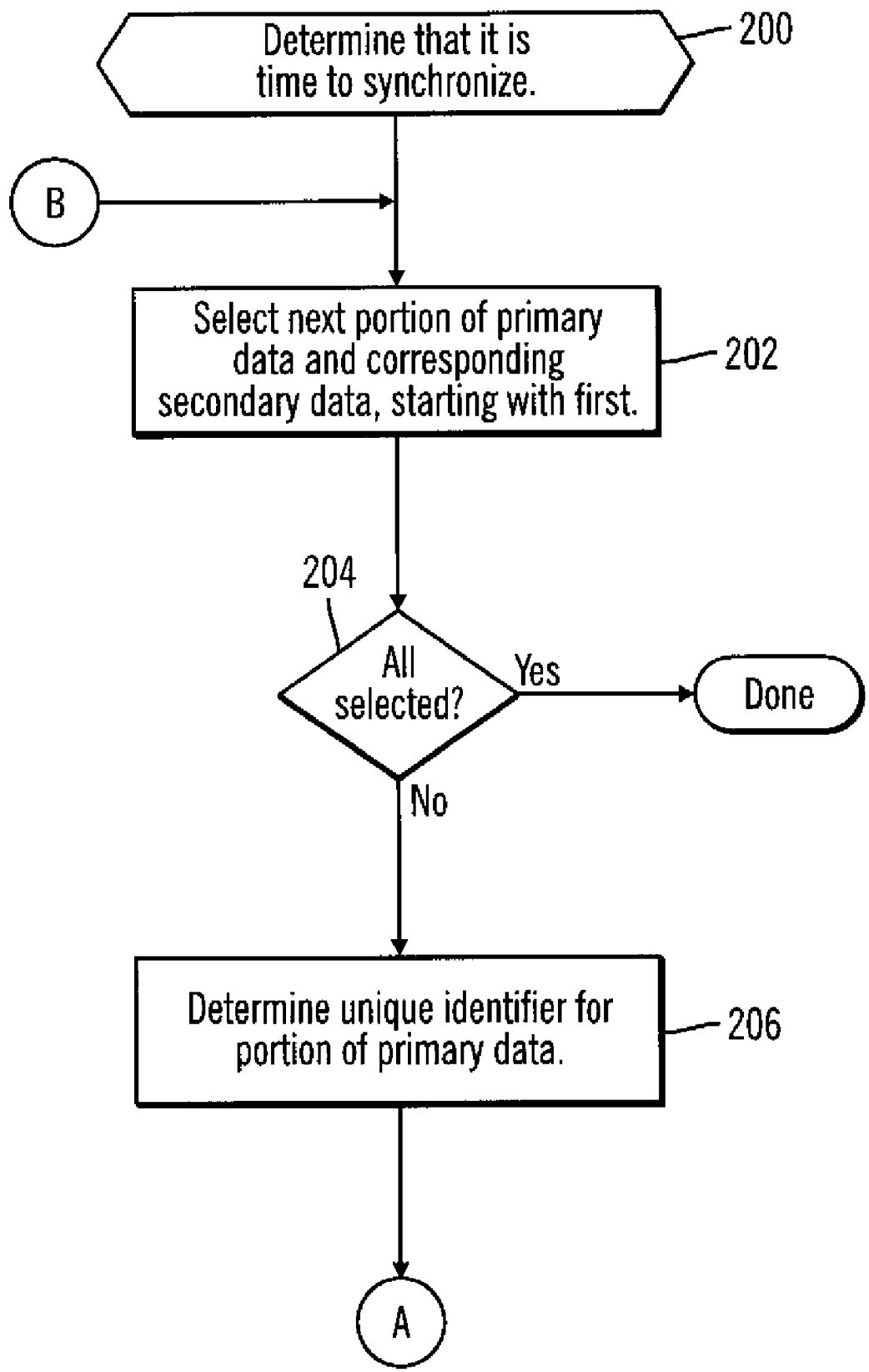
FIGS. 2A and 2B illustrate logic for data synchronization implemented in at least one synchronization system in accordance with certain implementations of the invention.
Figure 2B:
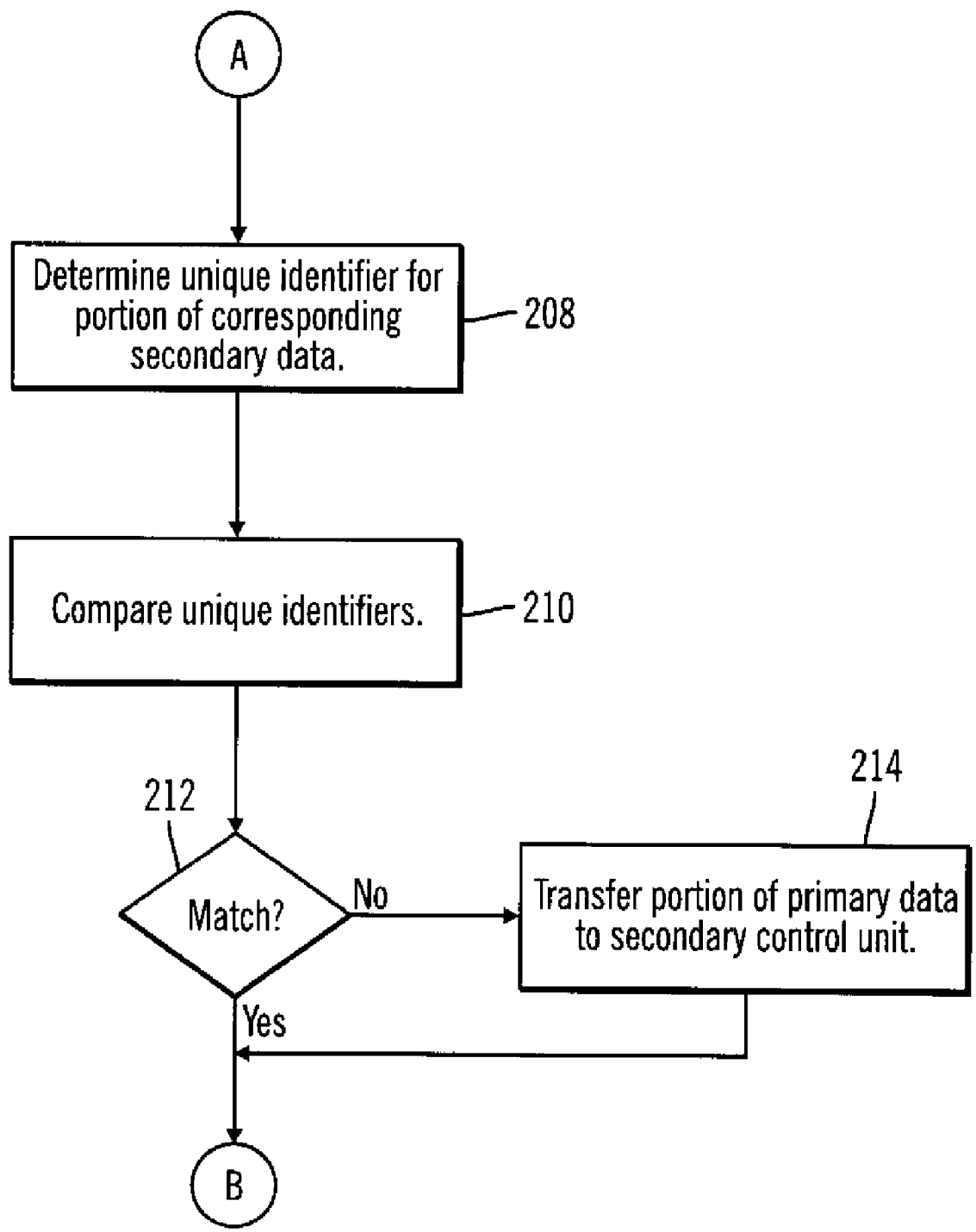

FIGS. 2A and 2B illustrate logic for data synchronization implemented in at least one synchronization system in accordance with certain implementations of the invention. For ease of reference, the terms "primary" and "secondary" are used herein. Implementations of the invention are applicable to synchronizing data between any two sources (e.g., a first source and a second source). Control begins at block 200 with a determination that it is time to synchronize data. In certain implementations, the determination that it is time to synchronize data is made when an error occurs (e.g., data is lost while being transferred from the primary control unit to the secondary control unit or data is corrupted at one control unit). In certain alternative implementations of the invention, the determination that it is time to synchronize data is made periodically.

In block 202, a next portion of primary data and corresponding secondary data is selected, starting with a first portion. Primary data refers to data on a primary storage device, and secondary data refers to data on a secondary storage device. In certain implementations of the invention, the portion of data is a track on a volume. In block 204, whether all portions of data have been selected is determined. If so, processing is done, otherwise, processing continues to block 206.

In block 206, a unique identifier is determined for the portion of primary data. In block 208, a unique identifier is determined for the corresponding portion of secondary data. In certain implementations of the invention, the unique identifiers are hash keys. That is, a hash key is associated with each portion of data on each of the volumes. The length of data for which a hash key is created can vary, as can the length of the hash key. In certain implementations of the invention, there is one hash key created for each portion of data (e.g., each track in each volume), and the hash key is 512 bits in length. Thus, there is a hash key created for each portion of data on the primary volume and one for each portion of data on the corresponding secondary volume.

In block 210, the unique identifiers for the portions of primary and corresponding secondary data are compared. In implementations of the inventions in which the unique identifiers are hash keys, the hash keys are compared to determine whether the portions of data are synchronized. In block 212, it is determined whether the unique identifiers match. If there is a match, processing continues to block 202, otherwise, processing continues to block 214. That is, for each portion of data (e.g., track) for which the unique identifiers (e.g., hash keys) match, implementations of the invention recognize that the portions of data (e.g., tracks) are synchronized (i.e., are identical). In block 214, the portion of primary data is resent from the primary volume to the secondary volume. Thus, copying an entire volume for resynchronization of data is avoided.

In certain implementations of the invention, the logic of FIGS. 2A and 2B occurs at a synchronization system at a secondary control unit. In such implementations, the secondary control unit selects portions of data for comparison (blocks 202, 204), requests the unique identifier for the portion of primary data from the primary control unit (block 206), determines the unique identifier for the portion of corresponding secondary data (block 208), and compares the unique identifiers (block 210). If the unique identifiers do not match (block 212), the secondary control unit requests the portion of primary data from the primary control unit (block 214).

In certain alternative implementations, the logic of FIGS. 2A and 2B occurs at a synchronization system at a primary control unit, and data from a secondary control unit may be copied to the primary control unit. For example, the primary control unit selects portions of data for comparison (blocks 202, 204), requests the unique identifier for the portion of secondary data from the secondary control unit (block 206), determines the unique identifier for the portion of corresponding primary data (block 208), and compares the unique identifiers (block 210). If the unique identifiers do not match (block 212), the primary control unit sends the portion of primary data to the secondary control unit (block 214).

In certain additional implementations, a separate synchronization system resides at a computer system other than the primary control unit or the secondary control unit. The separate synchronization system may also reside outside of the primary site and the secondary site. The separate synchronization system requests unique identifiers for a portion of data from the primary and secondary control units and directs the primary control unit to send the portion of data to the secondary control unit if the unique identifiers for the portion of data did not match.

There are a number of variations for implementations of the invention. In certain implementations of the invention, whenever a portion of data is updated, a unique identifier for the portion of data is generated and stored (e.g., in the storage devices or in cache) for future use. In certain alternative implementations, the unique identifiers are generated when there is a concern about data integrity. At that time, the synchronization systems at both the primary and the secondary control units create unique identifiers for each portion of data of each volume for which there is a concern about data integrity. Then, at least one of the synchronization systems compares the unique identifiers to determine whether synchronization is required. In yet other alternative implementations, unique identifiers are generated/updated periodically. In these implementations, whenever updates occur to a portion of data, it is noted that the unique identifier is no longer valid. When the synchronization system is idle or at predetermined intervals, the synchronization system updates the unique identifiers that are no longer valid. Also, when unique identifiers are requested, any unique identifiers that are not valid may be updated at the time of the request.

Certain implementations of the invention, in which the unique identifiers are hash keys, ensure that a match of two hash keys for a portion of data means that the two portions of data are identical. Furthermore, any hash key generation technique may be used with implementations of the invention, including, for example, the MD5 and Secure Hash Algorithm-1 (SHA-1) hash functions. MD5 is a well known one-way hash function that takes a portion of data and converts the portion of data into a fixed string of digits (which is also referred to as a message digest). SHA-1 is a well known hash function that takes a portion of data of less than $2^{64}$ bits in length and produces a 160-bit message digest. In certain implementations of the invention, the probability of two non-identical portions of data producing the same hash key is lower than the probability of a non-detectable error on a hard disk drive (HDD) of a storage device or a non-detectable error on the data link.

Figure 3A:
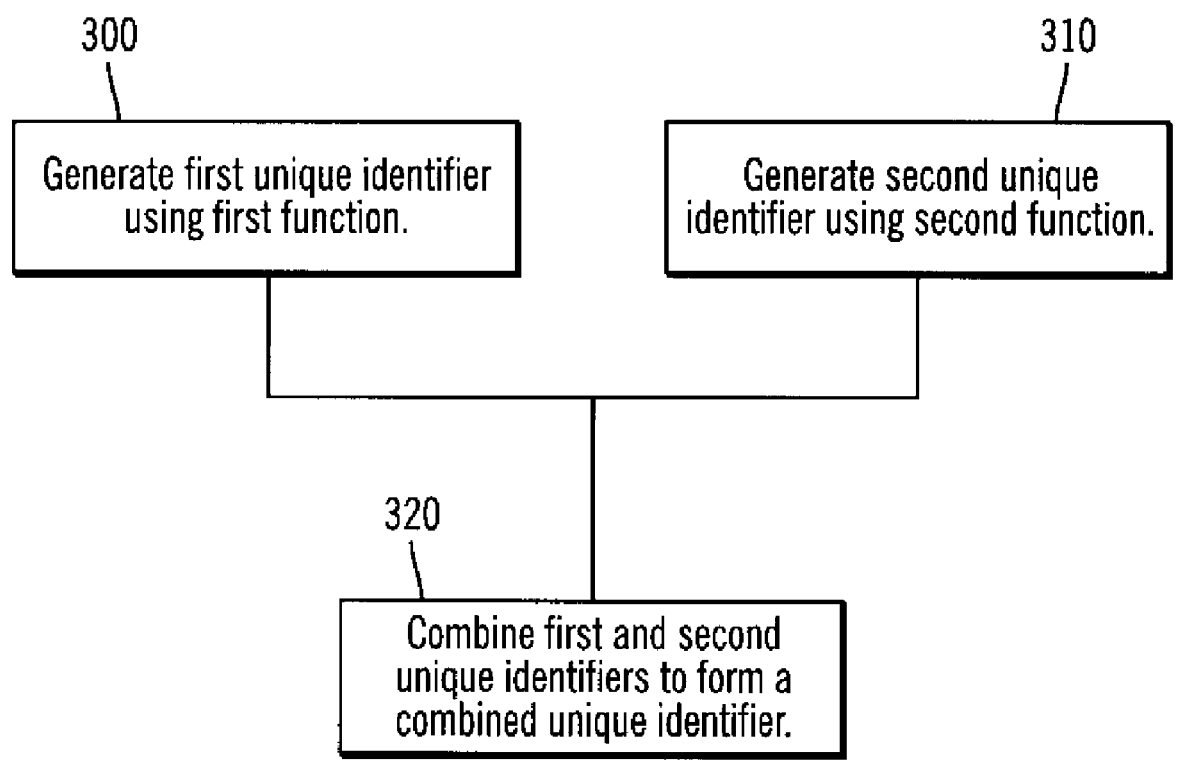
FIGS. 3A and 3B illustrate, in block diagrams, unique identifier generation techniques in accordance with certain implementations of the invention.
Figure 3B:
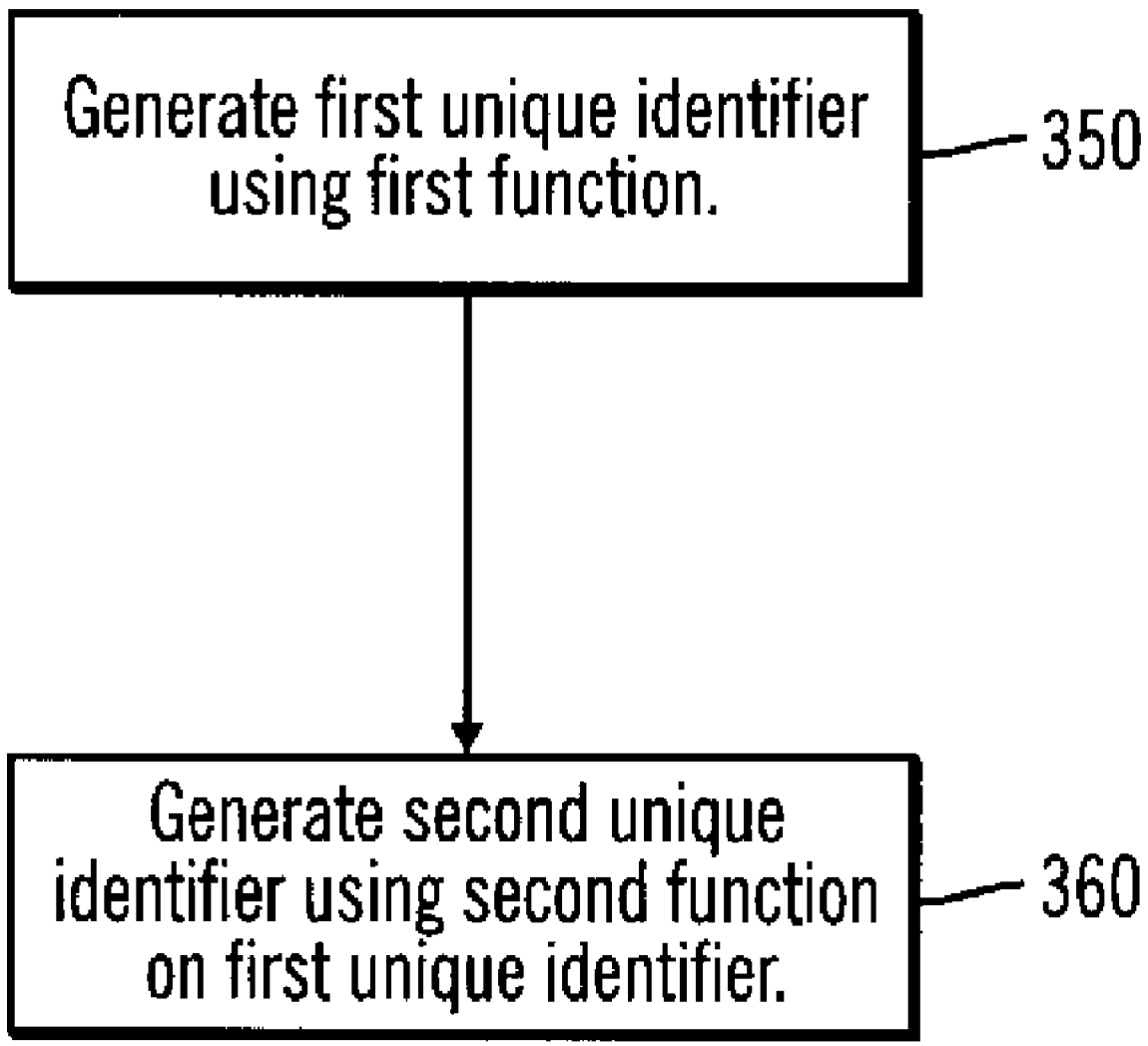

FIGS. 3A and 3B illustrate, in block diagrams, unique identifier generation techniques in accordance with certain implementations of the invention. In certain implementations of the invention, a single function (e.g., a hash function) is used to generate the unique identifiers (e.g., hash functions). Alternatively, as illustrated in FIGS. 3A and 3B, two or more functions are applied to a portion of data simultaneously to provide an even higher level of confidence that when the unique identifiers associated with the portions of data match, the portions of data are identical. For example, in block 300, a first function is used to generate a first unique identifier (e.g., a 256 bit MD5 key). Simultaneously with processing in block 300, in block 310, a second function is used to generate a second unique identifier (e.g., a 256 bit SHA-1 key). In block 320, the first and second unique identifiers are combined (e.g., concatenated) to form a combined unique identifier that is used in determining whether two portions of data are synchronized. The processing of blocks 300 and 310 may be performed in parallel or sequentially in any order.

In FIG. 3B, in block 350, a first function is used to generate a first unique identifier (e.g., a 256 bit MD5 key) for a portion of data. In block 360, a second function is used to generate a second unique identifier (e.g., a 256 bit SHA-1 key) based on the first unique identifier. That is, the result of the first function, which is the first unique identifier, is input into the second function. The new unique identifier generated by the second function is used in determining whether two portions of data are synchronized. Any technique for generating unique identifiers for portions of data is within the scope of the invention, and the examples of FIGS. 3A and 3B are not intended to limit the scope of the invention.

Figure 4:
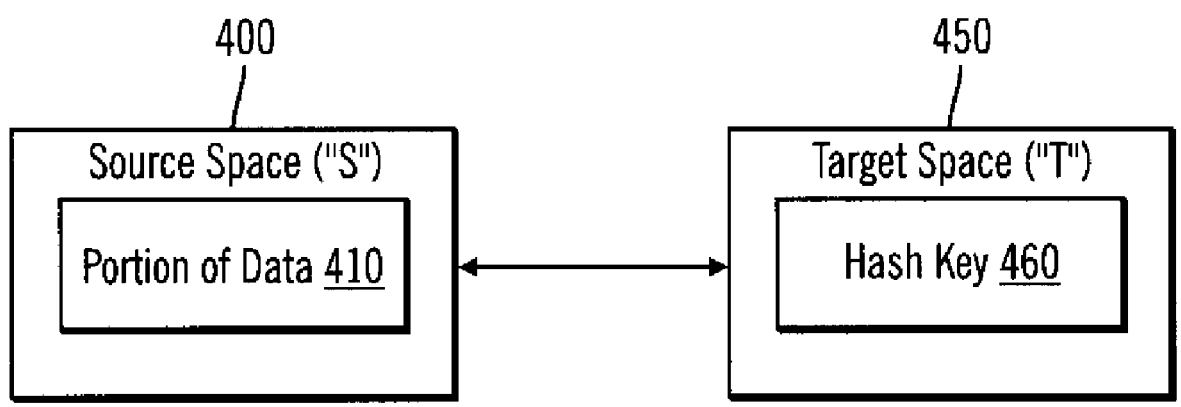
FIG. 4 illustrates, in a block diagram, a source space and a target space in accordance with certain implementations of the invention.

FIG. 4 illustrates, in a block diagram, a source space 400 and a target space 450 in accordance with certain implementations of the invention. The source space ("S") 400 includes a portion of data (e.g., a track) 410 of length N bits, and the target space ("T") 450 includes a hash key 460 of K bits. Then, the source space 400 is comprised of $2^N$ possible combinations, and the target space 450 is comprised of $2^K$ possible combinations. A hash key function maps a combination from the source space 400 into the target space 450.

Implementations of the invention are interested in knowing the probability that two identical hash keys are generated by different portions of data from the source space 400. For ease of reference, the term "source values" will be used to refer to the individual portions of data in the source space 400. In certain implementations of the invention, an assumption is made that the hash key function maps source values from the source space 400 into the target space 450 uniformly. That is, the inverse hash image of each element of the target space 450 is of "approximately" the same cardinality. This assumption is valid since the hash key generation techniques were created such that it is "computationally infeasible" to find two different portions of data that produce an identical hash key by "brute force" computational methods. In other words, the hash key function operates on source portions of data such that it is very difficult to find the exact combination of bits to change in the portion of data to have the function generate an identical hash key. Thus, the assumption that the hash key function maps source values from the source space 400 into the target space 450 uniformly is valid.

With reference to uniformity, the size of the probability of collision is determined as follows. For ease of reference, the term "target value" is used herein to refer to a unique identifier (e.g., hash key). Since $2^N$ values are uniformly mapped into a target space 450 of $2^K$, for any target value there will be $2^N/2^K$, or $2^{N-K}$ collisions. The term collision is used herein to indicate a match. Also, a false match is said to occur when two different portions of data that are not identical have identical hash keys. So, for a uniform function, the probability of a false match (or a collision) is the total number of possible collisions, $2^{N-K}-1$, divided by the total source space 400, $2^N$. Therefore, this probability is $(2^{N-K}-1)/2^N$, which is approximately, for large N, $2^{N-K}/2^N$, which is $2^{-K}$.

That is, certain implementations of the invention use a hash function ("h"), h: S->T, such that, for all hash keys ("t") in T, (max |h−1(t)|)/2N<<(probability of hard disk drive (HDD) undetectable failure rates). That is, the probability of two non-identical portions of data producing the same hash key is lower than the probability of a non-detectable error on a hard disk drive (HDD) of a storage device or a non-detectable error on the data link.

Therefore, the probability of a collision is effectively only dependent on the number of bits of the hash key for a sufficiently large portion of source data. By making this hash key length 256 bits, the probability of collision is $2^{-256}$ or $10^{-78}$. For 512 bits, the probability is $10^{-155}$. These probability numbers are much, much lower than those that are inherent in a standard HDD or in the data transfer link between two data sites. Thus, it is reasonable to say that the probability that the hash key function reports that two portions of data are identical when they are not is negligible compared to the probability that an undetectable errors indicator (e.g., bit) is written and read incorrectly from the HDD or a bit is corrupted while being transferred from the primary to the secondary storage control unit. That is, the probability of collision is $2^{256}$, and with the probabilities so low, even if the hash key functions are not exactly uniform, the probabilities are still much lower than the probability of a bit error on a hard disk drive.

Thus, implementations of the invention reduce both total time to synchronize two volumes and the bandwidth necessary to do so (i.e., transferring a unique identifier, rather than a portion of data, reduces bandwidth requirements). The amount of time saved by this technique is dependent on various factors, such as the size of the portions of data and the number of portions of data, the bandwidth of the data link, and the hash key function chosen and its implementation.

This invention reduces the amount of traffic that will flow over the data link by a factor depending on the exact configuration of the system. As an example, if the source data is a portion of data of 32 kilobytes (KB) and the hash key is 512 bits, or 64 bytes (B), the reduction in traffic on the data link is 99.8%. Of course, if any portions of data are found to be out of synchronization, the entire portion of data will be copied. Over the entire volume, however, there typically are few portions of data in need of transfer and this represents a large bandwidth savings.

In conclusion, implementations of the invention determine whether or not two storage mediums (e.g., volumes) are synchronized and, if not, identify data stored in the two storage media that are to be synchronized. In particular, implementations of the invention associate an identifier with each portion of data on a primary storage device and on a secondary storage device. If the identifier of a portion of primary data matches the identifier of a corresponding portion of secondary data, then the portions of data are determined to be synchronized. If the identifier of a portion of primary data does not match the identifier of a corresponding portion of secondary data, then the portions of data are determined to require synchronization, and the portion of primary data is copied over the portion of secondary data.

Additional Implementation Details

The described techniques for data synchronization may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The logic of FIGS. 2A, 2B, 3A, and 3B describes specific operations occurring in a particular order. In alternative implementations, certain of the logic operations may be performed in a different order, modified or removed. Moreover, operations may be added to the above described logic and still conform to the described implementations. Further, operations described herein may occur sequentially or certain operations may be processed in parallel, or operations described as performed by a single process may be performed by distributed processes.

The illustrated logic of FIGs. FIGS. 2A, 2B, 3A, and 3B may be implemented in software, hardware, programmable and non-programmable gate array logic or in some combination of hardware, software, or gate array logic.

Figure 5:
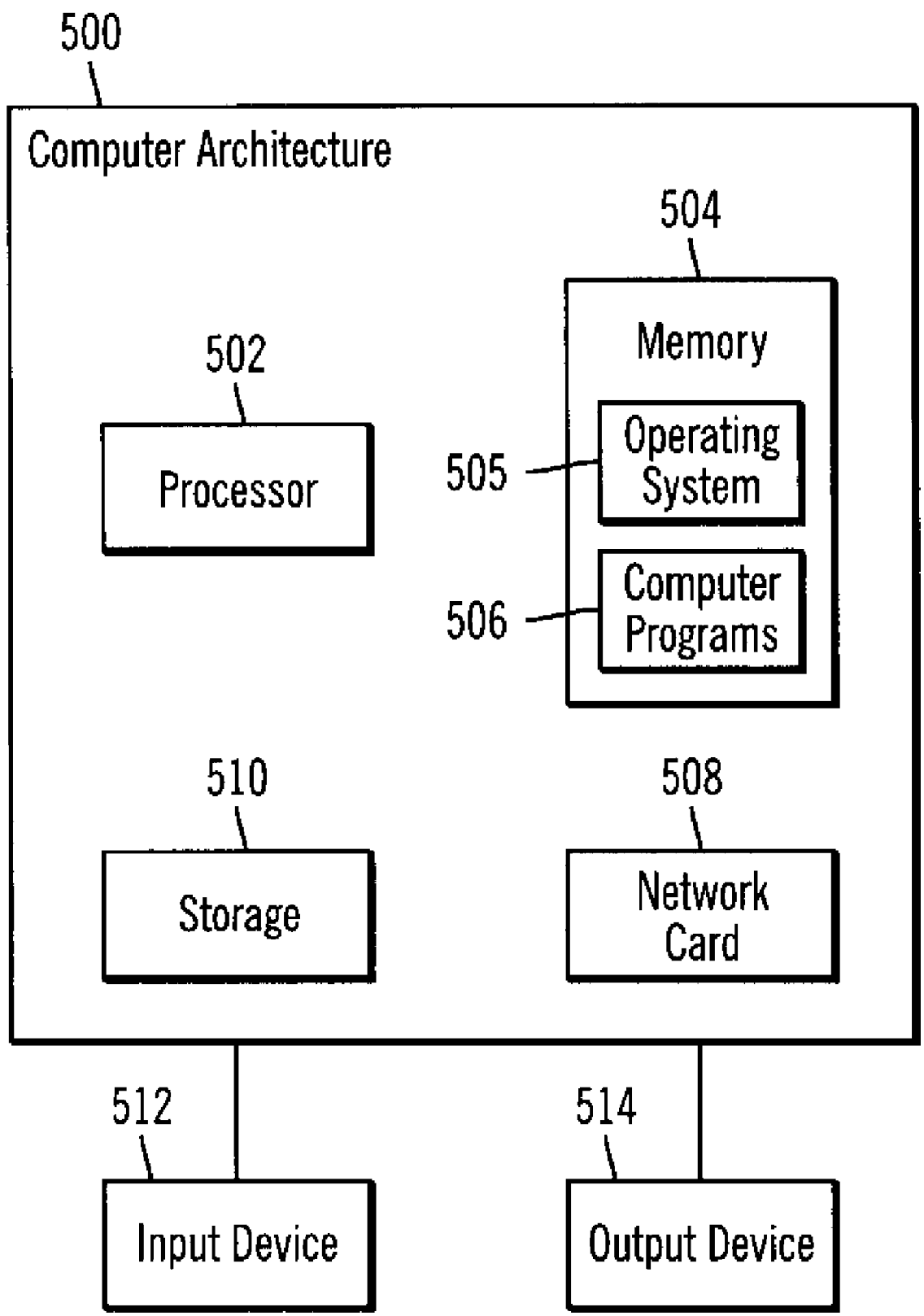
FIG. 5 illustrates an architecture of a computer system that may be used in accordance with certain implementations of the invention.

FIG. 5 illustrates an architecture of a computer system that may be used in accordance with certain implementations of the invention. The primary control units, secondary control units, and/or hosts may implement computer architecture 500. The computer architecture 500 may implement a processor 502 (e.g., a microprocessor), a memory 504 (e.g., a volatile memory device), and storage 510 (e.g., a non-volatile storage area, such as magnetic disk drives, optical disk drives, a tape drive, etc.). An operating system 505 may execute in memory 504. The storage 510 may comprise an internal storage device or an attached or network accessible storage. Computer programs 506 in storage 510 may be loaded into the memory 504 and executed by the processor 502 in a manner known in the art. The architecture further includes a network card 508 to enable communication with a network. An input device 512 is used to provide user input to the processor 502, and may include a keyboard, mouse, pen-stylus, microphone, touch sensitive display screen, or any other activation or input mechanism known in the art. An output device 514 is capable of rendering information transmitted from the processor 502, or other component, such as a display monitor, printer, storage, etc. The computer architecture 500 of the computer systems may include fewer components than illustrated, additional components not illustrated herein, or some combination of the components illustrated and additional components.

The computer architecture 500 may comprise any computing device known in the art, such as a mainframe, server, personal computer, workstation, laptop, handheld computer, telephony device, network appliance, virtualization device, storage controller, etc. Any processor 502 and operating system 505 known in the art may be used.

The foregoing description of implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method for data synchronization, comprising:
    for each portion of data at a primary volume in a primary storage device and each portion of corresponding data at a secondary volume in a secondary storage device,
        determining a first identifier for a portion of data at the primary volume, wherein a unique identifier is associated with each portion of data at the primary volume, wherein the first identifier for the portion of data at the primary volume is generated whenever the portion of data at the primary volume is updated;
        determining a second identifier for a portion of corresponding data at the secondary volume, wherein a unique identifier is associated with each portion of data at the secondary volume, and the second identifier for the portion of corresponding data at the secondary volume is generated whenever the portion of corresponding data at the secondary volume is updated;
        comparing the first and second identifiers; and
        in response to determining that the first and second identifiers do not match, replacing the portion of corresponding data at the secondary volume in the secondary storage device that stores data with the portion of data at the primary volume.

2. The method of claim 1, further comprising:
    when the first and second identifiers do match, determining that the portion of data at the primary volume and the portion of corresponding data at the secondary volume are identical.

3. The method of claim 1, wherein the first and second identifiers comprise hash keys.

4. The method of claim 3, further comprising:
    generating the hash keys using a single hash key function.

5. The method of claim 3, further comprising:
    generating the hash keys using multiple hash key functions.

6. The method of claim 1, further comprising:
    generating the first identifier by performing a first function on the portion of data at the primary volume; and
    generating the second identifier by performing the first function on the portion of corresponding data at the secondary volume.

7. The method of claim 1, wherein determining the first identifier further comprises:
    generating a first value by performing a first function on the portion of data at the primary volume;
    generating a second value by performing a second function on the portion of data at the primary volume; and
    generating the first identifier by combining the first value and the second value.

8. The method of claim 7, wherein determining the second identifier further comprises:
    generating a third value by performing the first function on the portion of corresponding data at the secondary volume;
    generating a fourth value by performing the second function on the portion of corresponding data at the secondary volume; and
    generating the second identifier by combining the third value and the fourth value.

9. The method of claim 1, wherein determining the first identifier further comprises:
    generating a first value by performing a first function on the portion of data at the primary volume; and
    generating the first identifier by performing a second function on the first value.

10. The method of claim 9, wherein determining the second identifier further comprises:
    generating a second value by performing the first function on the portion of corresponding data at the secondary volume; and
    generating the second identifier by performing the second function on the second value.

11. The method of claim 1, wherein the first identifier and the second identifier are generated when a determination is made that it is time to synchronize data at the primary volume and the secondary volume.

12. The method of claim 1, wherein the first identifier and the second identifier are generated periodically.

13. An article of manufacture comprising a computer readable storage medium storing code for data synchronization, wherein the code when executed by a processor on a computer causes operations to be performed, the operations comprising:
    for each portion of data at a primary volume in a primary storage device and each portion of corresponding data at a secondary volume in a secondary storage device,
        determining a first identifier for a portion of data at the primary volume, wherein a unique identifier is associated with each portion of data at the primary volume, wherein the first identifier for the portion of data at the primary volume is generated whenever the portion of data at the primary volume is updated;
        determining a second identifier for a portion of corresponding data at the secondary volume, wherein a unique identifier is associated with each portion of data at the secondary volume, and the second identifier for the portion of corresponding data at the secondary volume is generated whenever the portion of corresponding data at the secondary volume is updated;

comparing the first and second identifiers; and in response to determining that the first and second identifiers do not match, replacing the portion of corresponding data at the secondary volume in the secondary storage device that stores data with the portion of data at the primary volume.

14. The article of manufacture of claim 13, wherein the operations further comprise:

when the first and second identifiers do match, determining that the portion of data at the primary volume and the portion of corresponding data at the secondary volume are identical.

15. The article of manufacture of claim 13, wherein the first and second identifiers comprise hash keys.

16. The article of manufacture of claim 15, wherein the operations further comprise:

generating the hash keys using a single hash key function.

17. The article of manufacture of claim 15, wherein the operations further comprise:

generating the hash keys using multiple hash key functions.

18. The article of manufacture of claim 13, wherein the operations further comprise:

generating the first identifier by performing a first function on the portion of data at the primary volume; and generating the second identifier by performing the first function on the portion of corresponding data at the secondary volume.

19. The article of manufacture of claim 13, wherein the operation for determining the first identifier further comprises:

generating a first value by performing a first function on the portion of data at the primary volume;

generating a second value by performing a second function on the portion of data at the primary volume; and generating the first identifier by combining the first value and the second value.

20. The article of manufacture of claim 19, wherein the operation for determining the second identifier further comprises:

generating a third value by performing the first function on the portion of corresponding data at the secondary volume;

generating a fourth value by performing the second function on the portion of corresponding data at the secondary volume; and generating the second identifier by combining the third value and the fourth value.

21. The article of manufacture of claim 13, wherein the operation for determining the first identifier further comprises:

generating a first value by performing a first function on the portion of data at the primary volume; and generating the first identifier by performing a second function on the first value.

22. The article of manufacture of claim 21, wherein the operation for determining the second identifier further comprises:

generating a second value by performing the first function on the portion of corresponding data at the secondary volume; and generating the second identifier by performing the second function on the second value.

23. The article of manufacture of claim 13, wherein the first identifier and the second identifier are generated when a determination is made that it is time to synchronize data at the primary volume and the secondary volume.

24. The article of manufacture of claim 13, wherein the first identifier and the second identifier are generated periodically.

25. A system for data synchronization, comprising:

for each portion of data at a primary volume in a primary storage device and each portion of corresponding data at a secondary volume in a secondary storage device, means for determining a first identifier for a portion of data at the primary volume, wherein a unique identifier is associated with each portion of data at the primary volume, wherein the first identifier for the portion of data at the primary volume is generated whenever the portion of data at the primary volume is updated;

means for determining a second identifier for a portion of corresponding data at the secondary volume, wherein a unique identifier is associated with each portion of data at the secondary volume, and the second identifier for the portion of corresponding data at the secondary volume is generated whenever the portion of corresponding data at the secondary volume is updated;

means for comparing the first and second identifiers; and means for, in response to determining that the first and second identifiers do not match, replacing the portion of corresponding data at the secondary volume in the secondary storage device that stores data with the portion of data at the primary volume.

26. The system of claim 25, further comprising:

means for, when the first and second identifiers do match, determining that the portion of data at the primary volume and the portion of corresponding data at the secondary volume match.

27. The system of claim 25, wherein the first and second identifiers comprise hash keys.

28. The system of claim 27, further comprising:

means for generating the hash keys using a single hash key function.

29. The system of claim 27, further comprising:

means for generating the hash keys using multiple hash key functions.

30. The system of claim 25, further comprising:

means for generating the first identifier by performing a first function on the portion of data at the primary volume; and means for generating the second identifier by performing the first function on the portion of corresponding data at the secondary volume.

31. The system of claim 25, wherein determining the first identifier further comprises:

means for generating a first value by performing a first function on the portion of data at the primary volume;

means for generating a second value by performing a second function on the portion of data at the primary volume; and means for generating the first identifier by combining the first value and the second value.

32. The system of claim 31, wherein determining the second identifier further comprises:

means for generating a third value by performing the first function on the portion of corresponding data at the secondary volume;

means for generating a fourth value by performing the second function on the portion of corresponding data at the secondary volume; and means for generating the second identifier by combining the third value and the fourth value.

33. The system of claim 25, wherein determining the first identifier further comprises:

means for generating a first value by performing a first function on the portion of data at the primary volume; and means for generating the first identifier by performing a second function on the first value.

34. The system of claim 33, wherein determining the second identifier further comprises:

means for generating a second value by performing the first function on the portion of corresponding data at the secondary volume; and means for generating the second identifier by performing the second function on the second value.

35. The system of claim 25, wherein the first identifier and the second identifier are generated when a determination is made that it is time to synchronize data at the primary volume and the secondary volume.

36. The system of claim 25, wherein the first identifier and the second identifier are generated periodically.

* * * * *